United States Patent [19]

Okamoto

[11] 4,050,089
[45] Sept. 20, 1977

[54] APPARATUS FOR SHIFTING THE MAGNETIC TAPE HEAD IN A MULTITRACK TAPE PLAYER

[75] Inventor: Kenzi Okamoto, Kobe, Japan

[73] Assignee: Fujitsu Ten Limited, Kobe, Japan

[21] Appl. No.: 621,807

[22] Filed: Oct. 14, 1975

[30] Foreign Application Priority Data

Oct. 30, 1974 Japan .............................. 49-124242

[51] Int. Cl.² .......................... G11B 21/08; G11B 5/55
[52] U.S. Cl. ........................................ 360/106; 360/78
[58] Field of Search ................... 360/106, 78, 75, 105, 360/129, 92-94

[56] References Cited

U.S. PATENT DOCUMENTS

| 3,507,501 | 4/1970 | Lear | 360/78 |
| 3,575,422 | 4/1971 | Peltz et al. | 360/78 |
| 3,663,022 | 5/1972 | Ban | 360/78 |
| 3,752,484 | 8/1973 | Ban | 360/78 |
| 3,921,216 | 11/1975 | Wada | 360/106 |
| 3,943,568 | 3/1976 | Suzuki | 360/106 |
| B 350,589 | 1/1975 | Tozawa | 360/78 |

Primary Examiner—Alfred H. Eddleman
Attorney, Agent, or Firm—Daniel Jay Tick

[57] ABSTRACT

A lever device is provided between the magnetic tape head shift device for shifting the magnetic tape head and the capstan flywheel in a multitrack tape player. The lever device moves a specified first distance by energization of an operating device individually engaging, at both its ends, the magnetic tape head shift device and the capstan flywheel. The flywheel successively shifts the lever device a specified second distance and permits the head shift device to move until it selectively engages the flywheel by transferring the operation of a first process to the head shift device. The flywheel successively directly engages the head shift device, transferring operation of a second process. Thus, by the operation of the first and second processes, the head shift device shifts the magnetic tape head from a specific position to the next position.

7 Claims, 9 Drawing Figures

APPARATUS FOR SHIFTING THE MAGNETIC TAPE HEAD IN A MULTITRACK TAPE PLAYER

BACKGROUND OF THE INVENTION

The present invention relates to apparatus for shifting the magnetic tape head of cartridge type multitrack tape player. More particularly, the invention relates to apparatus for shifting the magnetic tape head of a multitrack tape player, which apparatus shifts the tape head via a driving force of the capstan flywheel of the tape player.

In a tape player using multitrack tape, several types of signal information are recorded and reproduced by shifting the magnetic tape head from a specific position to another position. In order to shift the magnetic head, a cam device having plurality of cam surfaces is used and the magnetic tape head shifts vertically as a result of tracing on the rotating cam surface. A known technique for driving the cam device in apparatus using a solenoid is disclosed, for example, in U.S. Pat. No. 3,437,762 to Lear and a known technique for using a driving force of the capstan flywheel is disclosed in U.S. Pat. No. 3,839,732 to Bachmann.

However, in known apparatus, the force generated by the solenoid is transmitted to the cam device through a ratchet mechanism, so that the solenoid must be comparatively powerful. A solenoid of such type is expensive and large in size, thereby creating disadvantages such as requiring a wider space in the tape player and considerably great power consumption.

The known apparatus may be thought to be advantageous, because an existing capstan flywheel is used. In a system of such type, the cam device is selectively engaged with the flywheel via a V-shaped lever, for example, in order to transmit the driving force of the flywheel to the cam device. More particularly, one arm of the lever is selectively engaged with a projection extending from the flywheel, while the other arm is selectively engaged with the ratchet wheel provided on the cam device and operated together with it. Thus, when both arms of the lever simultaneously engage the projection and the ratchet wheel, the projection, which rotated with the flywheel, operates the lever and the cam device thereby rotates via the ratchet wheel.

A comparatively small-sized solenoid, utilizing little power, is utilized in order to engage the lever with the projection and the ratchet wheel selectively. When the solenoid is energized, the lever moves and engages both members. If it is required to shift the magnetic tape head one track, the cam device must rotate at least 45°. For this purpose, in such case, the rotating angle of the lever must be wider than 45°, and therefore a longer operating time is required for the lever. The longer operating time is liable to cause an error in the driving of the cam device; that is, in the shift operation of the tape head.

Furthermore, since they cross almost at right angles to each other when the lever engages the projection of the flywheel, and the flywheel is rotating at a comparatively high speed, the lever receives a comparatively large shock. This will also cause an error in the shift operation of the tape head. Moreover, since the cam device has a configuration which is such as to be rotated by receiving the rotating force of the capstan flywheel via the lever having a comparatively large rotating angle, it is necessary to provide a reasonable gap between the cam device and the flywheel. This restriction prevents the close positioning of the cam device and the flywheel. This is a serious disadvantage to a desired reduction in size of the apparatus.

An object of the invention is to provide apparatus for shifting the magnetic tape head in a multitrack tape player, which apparatus overcomes the disadvantages of the known apparatus.

Another object of the invention is to provide apparatus of reduced size for shifting the magnetic tape head in a multitrack tape player.

Still another object of the invention is to provide apparatus which functions efficiently, reliably, smoothly and without error in shift operation for shifting the magnetic tape head in a multitrack tape player.

Yet another object of the invention is to provide apparatus of reduced size, which is light in weight and inexpensive in manufacture and shifts the magnetic tape head in a multitrack tape player with very little probability of error.

BRIEF SUMMARY OF THE INVENTION

In the apparatus of the invention, the head shift device, including the cam device and the ratchet wheel for shifting the magnetic tape head, directly engages the capstan flywheel when the head is to be shifted and is driven by the rotary force of said flywheel. This is accomplished by providing the head shift within the locus of the rotating flywheel. Futhermore, the lever device is provided between the flywheel and the ratchet wheel of the head shift device. The lever device is thus moved a first distance by the energy of the operating device. As a result, the lever device moves a second distance by engagement with the flywheel. At such time, the operation of the first step is transferred to the ratchet wheel of the head shift device, guiding the engagement of the ratchet wheel and the flywheel. The flywheel thereby directly drives the ratchet wheel, transferring the operation of the second step. Thus, the cam device in the head shift device is driven the specified angle of rotation.

The aforedescribed configuration of the apparatus of the invention, eliminates the need for a large space for the lever device connecting the cam device and the capstan flywheel. This results in a substantial reduction in size.

In accordance with the invention, cartridge type tape player apparatus having a tape deck, a replaceable cartridge accommodating a multitrack magnetic tape, tape driving means and a magnetic tape head, comprises a head shift device for shifting a magnetic tape head between specific tracks on a multitrack magnetic tape. A capstan shaft drives the tape via the tape driving means. A capstan member is affixed to the capstan shaft for rotation with the shaft. The capstan member has a projection extending therefrom. A lever device is mounted on the tape deck in a manner whereby it has freedom of movement for operating first and second steps, the operation of the first step including the lever device being shifted to a position in which it selectively engages the projection of the capstan member and the operation of the second step including the lever device driving the head shift device in cooperation with the projection of the capstan member participating in the operation of the first step and guiding the head shift device to a position in which it selectively engages the projection. A spring device is coupled to the lever device and maintains the lever device in the rest position. An operating device on the tape deck transfers the operation of the first step to the lever device in response to the detection of an indication on the tape thereby shifting the lever device from a rest position to an operating position against the action of the spring device.

The capstan member comprises a circular flywheel having a pair of spaced opposite substantially parallel surfaces and the projection extends transversely from one of the surfaces.

The operating device comprises a solenoid device.

The head shift device comprises a main shaft mounted on the tape deck and extending transversely therefrom. A cam is freely rotatably mounted on the main shaft. The cam has a cam surface having a shape corresponding to each of the tracks on the tape. A ratchet wheel is coaxially mounted with the cam and has a ratchet portion which engages step by step with the lever device and the projection of the capstan member for rotating the cam. A cam follower is coupled to the cam surface of the cam and to the head for moving the head along the main shaft in accordance with a contact position of the cam surface. A spring device maintains the cam follower in constant contact with the cam, and a rotation restraint device couples part of the cam follower to part of the capstan housing in a freely slidable manner thereby restricting rotation of the cam follower against the main shaft.

The ratchet wheel comprises a disc base portion and a ratchet portion in the form of a windmill positioned a step farther from the deck than the disc base portion. The disc base portion has a stop formed by circumferential cutouts and engaging an end of the lever device to complete the operation of the second step when the ratchet portion rotates through a specific angle driven by the projection of the capstan member. The stop restricts the amount of rotation of the ratchet wheel.

The method of the invention is for vertically shifting a magnet tape head of multitrack tape player apparatus including a tape deck, a cam having a plurality of cam surfaces, a capstan shaft having a capstan flywheel with a projection extending therefrom, a lever device mounted on the tape deck and movable relatively to the tape deck, an operating device mounted on the tape deck and energizable and deenergizable, a ratchet wheel rotatably mounted on the tape deck and having a ratchet portion positioned in the path of travel of the projection of the capstan flywheel for flywheel for cooperating with the cam, a first spring and a second spring. The method of the invention comprises the following steps. Rotating the cam via the capstan flywheel. Moving the lever device in a vertical direction relative to the tape deck for a first distance via the operating device in a manner whereby the lever device selectively engages the projection extending from the capstan flywheel and the ratchet portion of the ratchet wheel. Moving the lever device horizontally a second distance via the projection extending from the capstan flywheel and simultaneously rotating the ratchet wheel via the lever device for part of an angle of rotation required to complete one shift operation of the tape head thereby guiding the ratchet portion of the ratchet wheel to a position wherein it selectiely engages the projection. Rotating the capstan flywheel annd thereby rotating the projection thereof and thereby rotating the ratchet portion of the ratchet device through the remainder of the angle of rotation via direct engagement of the ratchet portion and the projection whereby the ratchet wheel and cam rotate together through a specific angle of rotation and thereby shift the tape head from one track position on the tape to other track positions thereon.

The lever device is returned the first distance in the vertical direction via the first spring upon deenergization of the operating device. The lever device is simultaneously returned the second distance horizontally via the second spring thereby returning the lever device to its initial position outside the path of travel of the projection of the capstan flywheel.

BRIEF DESCRIPTION OF THE DRAWINGS

In order that the invention may be readily carried into effect, it will now be descried with reference to the accompanying drawings, wherein.

In the FIGS., the same components are identified by the same reference numerals.

DETAILED DESCRIPTION OF THE INVENTION

Figure 1:
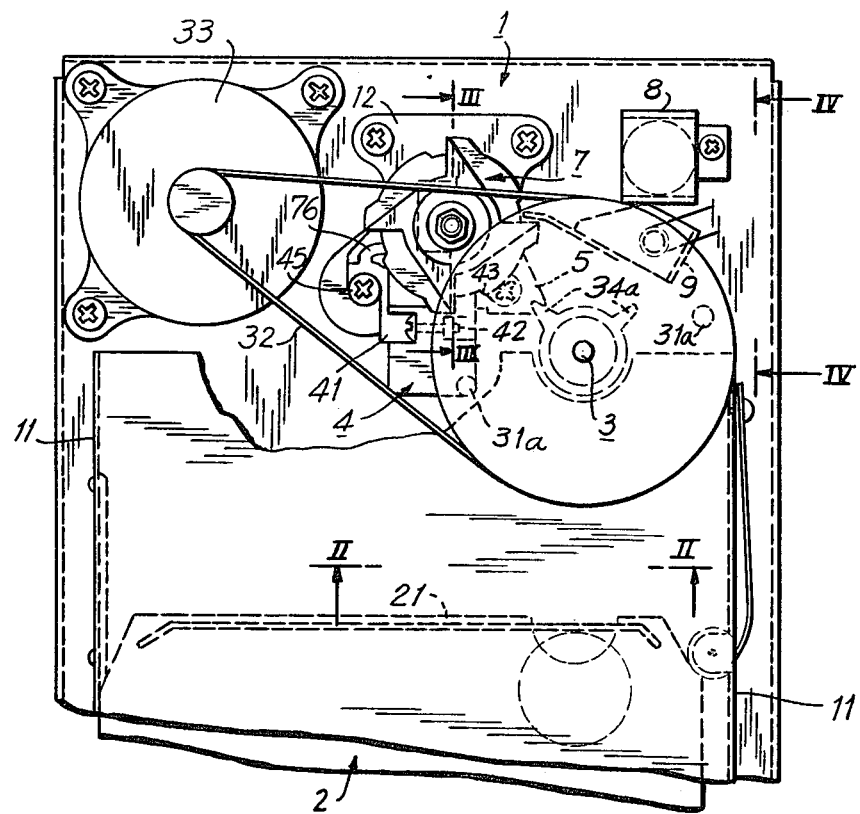
FIG. 1 is a top view of an embodiment of the apparatus of the invention for shifting the magnetic tape head in a multitrack tape player, mounted on the tape deck of such a tape player.

The front of the tape deck 1 of the tape player of FIG. 1 has a cartridge mounting slot (not shown in the FIGS.) via which a tape cartridge 2 is inserted. A cartridge guide 11 extends to the inside of the tape player along the cartridge mounting slot. A capstan shaft 3 is in the contact with the magnetic tape 21 accommodated in the tape cartridge 2. The capstan shaft 3 drives the tape 21 by the friction force between said shaft and said tape, and is provided at the rear of the tape deck 1. A magnetic tape head 4 picks up or records signal information on the magnetic tape 21.

The capstan shaft 3 has a flywheel 31, which is freely rotatable around said shaft. The flywheel 31 is coupled to a driving motor 33 via a flat drive belt 32. The magnetic tape head 4 is mounted on the tape deck 1 together with the head shift device, so that said head may shift freely on the multitrack tape 21.

Figure 2:
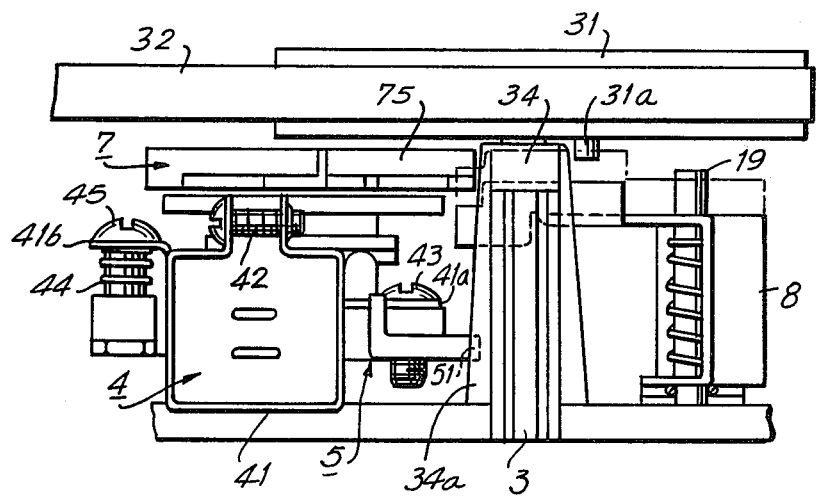
FIG. 2 is a view, taken along the lines II—II, of FIG. 1.
Figure 3:
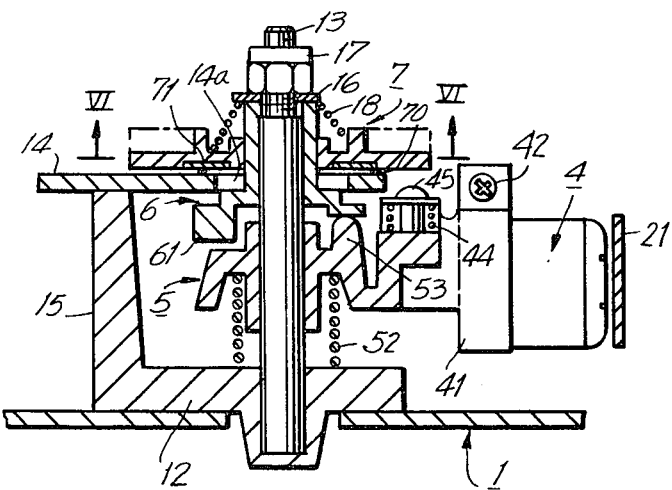
FIG. 3 is a view, partly in section, of the mounting apparatus of the magnetic tape head, taken along the lines III—III, of FIG. 1.

FIGS. 2 and 3 illustrate the mounting apparatus of the tape head. The tape head 4 is affixed in a U-shaped bracket 41 via screws 42. The U-shaped bracket 41 is mounted on one side 41a of a cam follower 5 by a screw 43 and is mounted on the other side 41b of said cam follower via a spring 44 and an azimuth adjusting screw 45. Therefore, when the azimuth adjusting screw 45 is rotated right or left, the tape head 4 rotates in a desired direction around the center of the screw 43, making it possible to adjust the azimuth of said tape head for the magnet tape 21.

The cam follower 5 is mounted on a main shaft 13 which is mounted on the sub-chassis 12 on the tape deck 1 and can move only in the vertical direction. The rotation of the cam follower 5 is restricted because the contact relation between the tape head 4 and the magnetic tape 21 must be maintained normal. This is realized by engaging a notch 51 formed at one end of the cam follower 5 with a mechaniclly supporting rib 34a formed on the outer case (capstan housing) 34 of the capstan shaft 3.

The capstan housing 34 is molded on the sub-chassis 12. The cam follower 5 is always urged or pushed upward by a spring 52 provided between the sub-chassis 12 and said cam follower. A boss 53 on the upper surface of the cam follower 5 is in direct contact with a cam surface 61 of a cam 6.

The cam 6 is mounted on the shaft 13 and may rotate and move in vertical directions. Several cam surfaces 61 are provided at the lower surface of the cam 6 at different heights above the sub-chassis 12. The cam surfaces 61 respectively correspond to the position of each track of the multitrack magnetic tape 21. The cam 6 has a ratchet wheel 7 and moves and rotates together with said ratchet wheel 7 as it moves.

Figure 6:
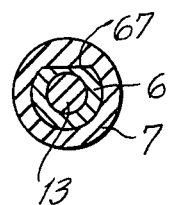
FIG. 6 is a cross-sectional view, taken along the lines XI—XI, of FIG. 3.

FIG. 6 illustrates the mounting of the ratchet wheel 7 on the cam 6. As shown in FIG. 6, a flat area 67 is formed at the hub of the cam 6 and the ratchet wheel 7 in order to prevent relative rotation between said cam and said ratchet wheel. The ratchet wheel 7 and the cam 6 rotate together, as a unit, since said ratchet wheel is tightly fitted onto said cam, besides being keyed thereto, in the aforedescribed manner.

An auxiliary chassis 14 is affixed to a rear wall 15 of the sub-chassis 12 and extends between the cam 6 and the ratchet wheel 7. The shaft 13 passes through the auxiliary chassis 14. The auxiliary chassis 14 has a circular electrical pattern (not shown in the FIGS.) at the surface around an axial hole 14a through said auxiliary chassis. The electrical pattern forms a change-over switch 70 with an electrical contact 71 provided at the lower surface of the ratchet wheel 7 and may serve for program indication of the tape player by cooperation with lamps (not shown in the FIGS.) which display the track position on the magnetic tape used, the cam surface position of the cam 6 and the program name.

The upper end of the shaft 13 is slightly tapered down and is externally threaded. A washer 16 and a nut 17 are mounted on the tapered end of the shaft 13. The washer 16 and the ratchet wheel 7 are positioned above and below a spring 18, which always pushes the ratchet wheel downward. This maintains the electrical contact 71 in firm electrical contact with the electrical pattern on the auxiliary chassis 14.

In the aforedescribed structure the shift operation of the tape head 4 is as follows. When the ratchet wheel 7 rotates, the cam 6 also rotates. When the cam 6 rotates, the boss 53 of the cam follower 5 contacts the cam surfaces of other cams, thus shifting said cam follower in a vertical direction along the shaft 13. This results in upward or downward vertical shifting of the tape head 4. The rotation of the ratchet wheel 7 is limited to a specified angle, which is 90° in the illustrated example, and the upper surface of the cam 6 is also leveled corresponding to said angle. Thus, the tape head 4 is shifted so that it corresponds to different tracks on the magnetic tape 21 used each time the ratchet wheel 7 rotates a specified angle. When the nut 17 is rotated clockwise or counterclockwise, the cam 6 and the cam follower 5 may move vertically along the main shaft 13 due to the vertical movement of the nut itself. This permits fine adjustment of the tape head height to be made.

The driving mechanism of the cam 6 is explained with reference to FIGS. 2 to 5. As hereinbefore described, the cam 6 is driven by the ratchet wheel 7. As shown in FIG. 5, the ratchet wheel 7 comprises a disc base portion 74 and a ratchet portion 75 which is formed like a windmill and is mounted on said disc base portion with a slight difference in horizontal level. The circumference of the disc base portion 74 has two types of cutouts 72 and 73, which are cut with different radial lengths.

When the ratchet wheel 7 is driven via the first and second cutouts 72 and 73, said cutouts prevent the disc base portion 74 from colliding with an auxiliary lever hereinafter described. A reverse rotation of the ratchet wheel 7 is prevented by the difference 72a in radius of the first cutout 72 when it engages a ratchet 76 formed like a plate spring, as shown in FIG. 1. Over-rotation of the ratchet wheel 7 is prevented by the difference 73a in radius of the second cutout 73 when it engages the auxiliary lever, hereinafter described.

The flywheel 31 is mounted via the capstan shaft 3 at the upper part of the ratchet wheel 7, as shown in FIG. 2. The flywheel 31 has two projections 31a which project downward from a line connecting the center line. As shown in FIG. 2, when considering the relation between the projection 31a and the ratchet wheel 7 in their horizontal location and height, the projection 31a faces the ratchet portion 75 of said ratchet wheel. The projection 31a therefore always collides with the ratchet portion 75 and rotates the ratchet wheel 7 when it so collides. However, this blocks the driving of the tape 21 and causes wow and flutter. In addition, the tape head 4 is subjected to a shifting force undesirably. In order to eliminate such phenomena, the ratchet wheel 7 is usually placed as shown in FIG. 5, so that the projection 31a moves as shown by broken lines b above the disc base portion 74 of said ratchet wheel.

Figure 4:
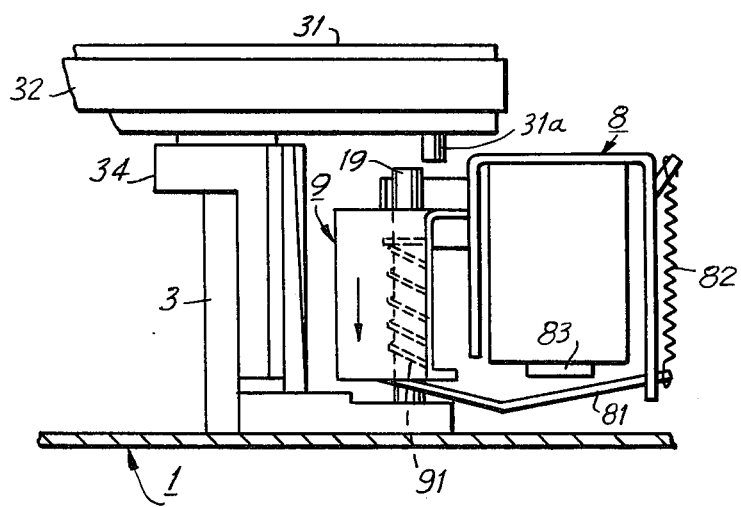
FIG. 4 is a view, partly in section, of the operating device, taken along the lines IV—IV, of FIG. 1.
Figure 5:
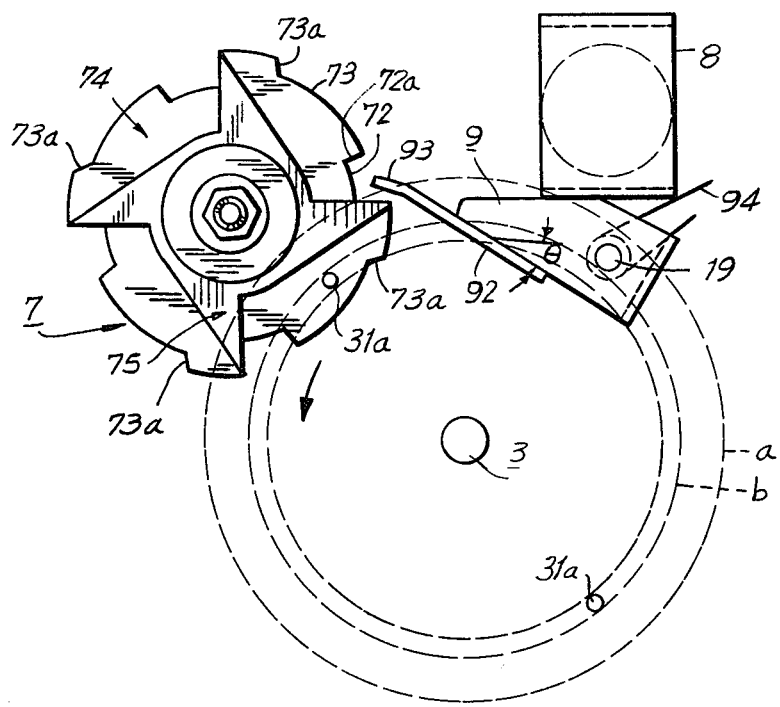
FIG. 5 is a top view of an embodiment of the head shift device of the apparatus of the invention.

A solenoid 8 and an auxiliary lever 9 are mounted under the flywheel 31, as shown in FIGS. 4, 5, 7a, 7b and 7c. The auxiliary lever 9 is mounted on a sub-shaft 19 mounted vertically on the sub-chassis 12, and is able to slide freely. The auxiliary lever 9 is always pressed downward by a return spring 91, as shown in FIG. 4. Furthermore, the auxiliary lever 9 is folded in a folded portion 92 at one end. The folded portion 92 selectively contacts the projection 31a of the flywheel 31 and a tongue portion 93 of the auxiliary lever 9 is projected to the lower space of the first cutout 72 of the ratchet wheel 7, as shown in FIGS. 1 and 5.

On the other hand, the lower end of the auxiliary lever 9 engages a rocking lever 81, which is operated by the solenoid 8, as shown in FIG. 4. Furthermore, the auxiliary lever 9 is provided with a wire spring 94 in the space between the sub-shaft 19 and the solenoid 8. The wire spring 94 always holds the auxiliary lever 9 in its position shown in FIG. 5. The rocking lever 81 is provided with a coil spring 82, which maintains said rocking lever separated from the magnetic pole 83 of the solenoid 8.

Broken lines a and b in FIGS. 5, 7a, 7b and 7c show the loci of the flywheel 31 and its projection 31a in order to maintain the clarity of the drawings.

The driving operation of the ratchet wheel 7 is described as follows. When the magnetic tape 21 is being driven, the flywheel 31 rotates together with the capstan shaft 3, as is well known, and the projection 31a rotates with said flywheel. From the viewpoint of the engagement between the projection 31a and the ratchet wheel 7, as described, with relation to FIGS. 2 and 5, the locus of the rotating projection 31a always passes over the disc base portion 74 of the ratchet wheel 7. The projection 31a will therefore never collide with the ratchet portion 75 of the ratchet wheel 7 and rotate said ratchet portion.

A manual program change-over switch (not shown in the FIGS.) is provided at the front of the tape deck. An automatic program change-over switch (not shown in the FIGS.) comprises electrically conductive foil adhered to the tape end and a pair of electrical contacts which are electrically short-circuited by said foil. When the manual or automatic program change-over switches are closed, the rocking lever 81 is drawn up in resistance to the coil spring 82, through the cooperation of the solenoid 8. As a result, the auxiliary lever 9 is pulled up, as shown in FIG. 4, and moves as long as a first distance. Thus, the tongue portion 93 of the auxiliary lever 9 enters the cutout 72 of the ratchet wheel 7, as shown by the broken line in FIG. 2. When the projection 31a of the flywheel 31 engages the auxiliary lever 9, the ratchet wheel 7 proceeds one step in the sequence shown in FIGS. 7a, 7b and 7c.

Figure 7A:
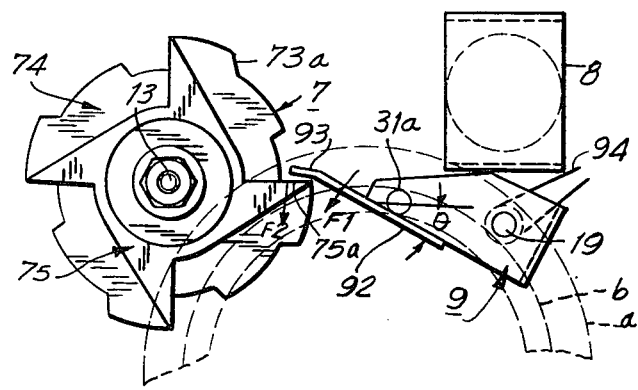
FIGS. 7a, 7b and 7c are top view of the head shift device of FIG. 5, illustrating the operation thereof.
Figure 7B:
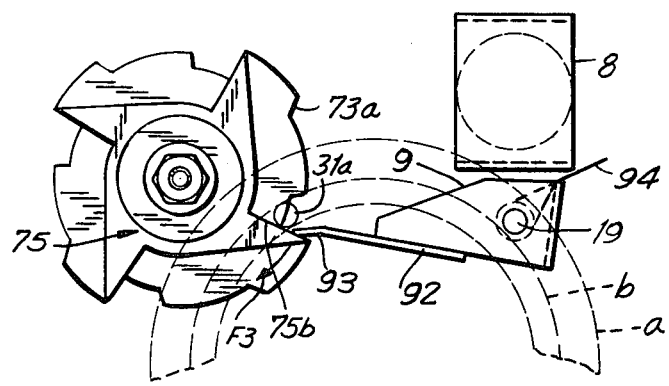

In other words, the projection 31a contacts the folded portion 92 of the auxiliary lever 9, as shown in FIG. 7a, rotating said auxiliary lever in a direction indicated by an arrow F1 of FIG. 7a, against the wire spring 94. The tongue portion 93 of the auxiliary lever 9 collides with an end 75a of the ratchet portion 75 of the ratchet wheel 7, rotating said ratchhet wheel in the direction indicated by an arrow F2 of FIG. 7a, about the main shaft 13. As a result, the ratchet portion 75 of the ratchet wheel 7 is guided into the path of travel b of the projection 31a, as shown in FIG. 7b, is further guided to the folded portion 92 of the auxiliary lever 9, and in turn moves to said ratchet portion, which is the operation of the first step, as the flywheel 31 rotates further.

The projection 31a is separated from the folded portion 92 of the auxiliary lever 9 in the succeeding operation, and moves into contact with a side 75b of the ratchet portion 75 of the ratchet wheel 7. The ratchet wheel 7 is thereby rotated directly in the direction indicated by an arrow F3 of FIG. 7b. As the flywheel 31 rotates further, the projection 31a causes the ratchet wheel 7 to rotate further.

Figure 7C:
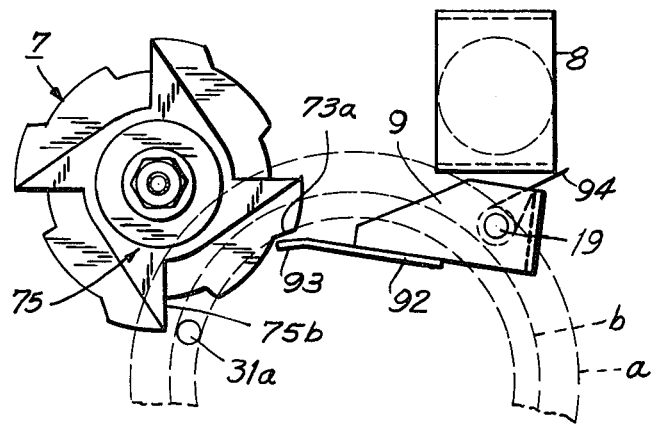

Thereafter, in the condition shown in FIG. 7c, the projection 31a separates itself from the side 75b of ratchet portion 75, stopping the driving of the ratchet wheel 7, which is the operation of the second step. At such time, the ratchet wheel 7 may continue to rotate further, due to inertia, but this is suspended when the tongue portion 93 of the auxiliary lever 9 collides with a stop 73a of the second cutout 73 of the disc base portion 74.

As hereinbefore described, with the operations of the first and second steps, the ratchet wheel 7 rotates at the specified angle, which is 90° in this case, realizing one step. After the one step, the solenoid 8 is automatically deenergized and the rocking lever 81 is depressed downward by the coil spring 82. The auxiliary lever 9 is thereby returned to the initial position by the return spring 91 and the wire spring 94. Thus, the ratchet wheel 7 and the interlocking cam 6 are rotated through the specified angle. This operation is repeated by the energization and deenergization of the solenoid 8, and the ratchet wheel 7 and the cam are again rotated up to the specified angle.

As is clear from the foregoing explanation, in the apparatus of the present invention for shifting the magnetic tape head, the ratchet wheel, and therefore the cam device, is directly rotated by the projection of the capstan flywheel. In other words, the shifting of the head is not accomplished via the proper medium and is accomplished positively, resulting in a reduction in size of said apparatus. In addition, the lever device, or auxiliary lever of the apparatus of the present invention has only the function of guiding the ratchet portion of the ratchet wheel to the area within the rotating locus of the projection via operation by the projection of the flywheel. The engaging angle of the lever device and the projection therefore becomes considerably narrower than 90°, as shown in FIGS. 5, 7a, 7b and 7c, and the shock resulting from the contact of the lever device and the projection is very small. For this reason, there is little probability of the occurrence of erroneous shit operation of the tape head. Moreover, a less expensive and smaller power solenoid may be used, as compared with the existing structure in which the ratchet wheel is driven by the solenoid. Thus, the apparatus of the present invention for shifting magnetic head is very useful when it is adapted to the head shift apparatus of a cartridge type tape player, which requires a small size, a light weight and a low cost.

While the invention has been described by means of a specifiic example and in a specific embodiment, I do not wish to be limited thereto, for obvious modifications will occur to those skilled in the art without departing from the spirit and scope of the invention.

I claim:

1. Cartridge type tape player apparatus having a tape deck, a replaceable cartridge accommodating a multitrack magnetic tape, tape driving means and a magnetic tape head, said apparatus comprising
   head shift means for shifting a magnetic tape head between specific tracks on a multitrack magnetic tape;
   a capstan shaft for driving the tape via the tape driving means;
   a capstan member affixed to the capstan shaft for rotation with said shaft, said capstan member having a projection extending therefrom;
   lever means provided on a vertical axis on the tape deck with freedom of movement in vertical and horizontal directions, said lever means having a guide member selectively engaging the projection of the capstan member, said guide member being positioned so that it crosses the locus of the rotating projection when it is driven in a vertical direction, said lever means having an end portion for guiding an engaging part of the head shift means in a manner whereby it rotates up to the position of the projection on the locus of the rotating projection when said guide member rotatably moves along the vertical axis in cooperation with said projection;
   spring means coupled to said lever means and maintaining said lever means in the rest position; and
   operating means mounted on the tape deck for transferring the operation in the vertical direction to said lever means in response to the detection of an indication on the tape thereby shifting said lever means from a rest position to an operating position against the action of said spring means.

2. Cartridge type tape player apparatus as claimed in claim 1, wherein the capstan member comprises a circular flywheel having a pair of spaced opposite substantially parallel surfaces and the projection extends transversely from one of said surfaces.

3. Cartridge type tape player apparatus as claimed in claim 1, wherein the operating means comprises a solenoid device.

4. Cartridge type tape player apparatus as claimed in claim 1, wherein the head shift means comprises a main shaft mounted on the tape deck annd extending transversely therefrom, a cam freely rotatably mounted on the main shaft, said cam having a cam surface having a shaped corresponding to each of the tracks on the tape, a ratchet wheel coaxially mounted with the cam and having a ratchet portion which engages step by step with said lever means and the projection of the capstan member for rotating said cam, a cam follower coupled to the cam surface of said cam and to said head for moving said head along said main shaft in accordance with a contact position of said cam surface, spring means for maintaining the cam follower in constant contact with said cam, and rotation restraint means coupling part of said cam follower to part of the capstan housing in a freely slidable manner thereby restricting rotation of said cam follower against the main shaft.

5. Cartridge type tape player apparatus as claimed in claim 4, wherein the ratchet wheel comprises a disc base portion and a ratchet portion in the form of a windmill positioned a step farther from the tape deck than the disc base portion, said disc base portion having a stop formed by circumferential cutouts and engaging an end portion of said lever means rotated by the projection of the capstan member when the ratchet portion rotates through a specific angle driven by the projection of the capstan member, said stop restricting the amount of rotation of the ratchet wheel.

6. A method of vertically shifting a magnetic tape head of multitrack tape player apparatus including a tape deck, a cam having a plurality of cam surfaces, a capstan shaft having a capstan flywheel with a projection extending therefrom, a lever device mounted on the tape deck independent from the capstan shaft and movable by the projection relatively to the tape deck, an operating device mounted on the tape deck, and energizable and deenergizable, a ratchet wheel rotatably mounted on the tape deck and having a ratchet position positioned in the path of travel of the projection of the capstan flywheel for cooperating with the cam, a first spring and a second spring, said method comprising the steps of rotating the cam via the capstan flywheel;

moving the lever device in a vertical direction relative to the tape deck for a first distance via the operating device in a manner whereby the lever device selectively engages the projection extending from the capstan flywheel and the ratchet portion of the ratchet wheel;

moving the lever device horizontally a second distance via the projection extending from the capstan flywheel and simultaneously rotating the ratchet wheel via the lever device for part of an angle of rotation required to complete one shift operation of the tape head thereby guiding the ratchet portion of the ratchet wheel to a position wherein it selectively engages the projection; and rotating the capstan flywheel and thereby rotating the projection thereof and thereby rotating the ratchet portion of the ratchet device through the remainder of the angle of rotation via direct engagement of the ratchet portion and the projection whereby the ratchet wheel and cam rotate together through a specific angle of rotation and thereby shift the tape head from one track position on the tape to other track positions thereon.

7. A method as claimed in claim 6, further comprising the steps of returning the lever device the first distance in the vertical direction via the first spring upon deenergization of the operating device, and simultaneously returning the lever device the second distance horizontally via the second spring thereby returning the lever device to its initial position outside the path of travel of the projection of the capstan flywheel.

* * * * *